Patented Oct. 21, 1941

2,260,085

UNITED STATES PATENT OFFICE 2,260,085

PROCESS FOR THE PREPARATION OF SYNTHETIC ANTIRACHITIC PROVITAMINS AND VITAMINS

Nicholas A. Milas, Belmont, and Robert Heggie, Cambridge, Mass., assignors to Research Corporation, New York, N. Y., a corporation of New York No Drawing. Application April 6, 1938,
Serial No. 200,554

11 Claims. (Cl. 204—159)

This invention relates to the production of antirachitic provitamins and vitamins.

It is well-known that a number of body fats contain natural provitamin D which is converted upon exposure to sunlight or artificial ultra-violet light into the natural antirachitic principle. It is further known that the natural vitamin D may be related to cholesterol rather than to ergosterol. A synthetic antirachitic provitamin has already been prepared by Windaus and Schenck (U. S. Patents 2,098,984, 2,098,985 and 2,099,550) from cholesterol and other sterols, but the preparation involves a number of difficult chemical steps and the over-all yields are comparatively small.

It is the purpose of this invention to provide a method for the direct conversion of sterols, the nuclear structure of which is of the cholesterol type, such as cholesterol, sitosterol and stigmasterol, preferably in the form of their esters and ethers into antirachitic provitamins which can be easily converted into the antirachitic vitamins by the well-known methods of ultra-violet irradiation or exposure to electric discharges. Our process is based on the principle of direct partial dehydrogenation of the sterol to give the provitamin, such as 7-dehydrocholesterol which is assumed to be identical with the natural provitamin D. The change may be expressed by the following general equation:

The invention will be described and illustrated more fully hereinafter with reference to the conversion of cholesterol into the provitamin 7-dehydrocholesterol.

The reaction is not confined to cholesterol acetate, but is applicable to any ester or ether of cholesterol. As acceptors of hydrogen for the partial dehydrogenation of cholesterol esters one may use ketones, aldehydes, quinones, sulfur, organic disulfides. The reaction may be carried out in the presence or absence of catalysts such as palladium, platinum or osmium black; in the presence or absence of inert solvents such as benzene or ethers such as dioxane, or anhydrides such as acetic anhydride, and at temperatures ranging from room temperature to about 150° C.

The reaction may also be carried out in the presence of biochemical catalysts such as dehydrogenases found in the muscle tissues, liver, yeast, fungi or various types of bacteria such as B. coli, in the presence or absence of hydrogen acceptors such as methylene blue or indigo blue or other well-known hydrogen acceptors.

Furthermore, the reaction was also found to proceed smoothly in the presence of light as from an ordinary 250-watt light bulb or from a quartz mercury lamp in the presence of acceptors such as ketones, quinones, dyes of the type of methylene blue, eosin or indigo blue, with or without the presence of catalysts such as palladium, platinum or osmium black.

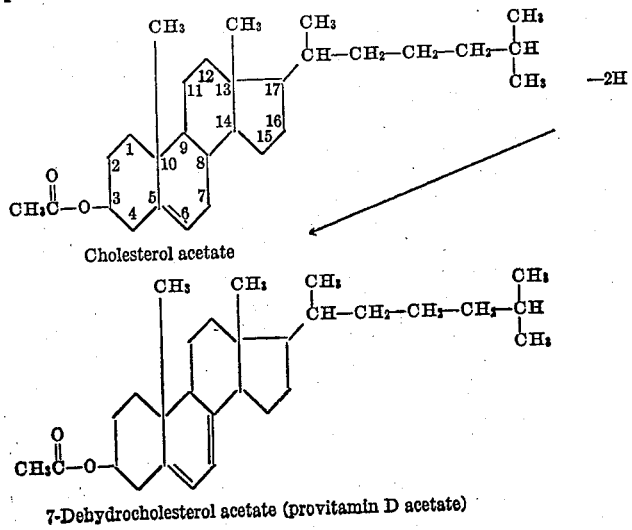

The following is an outline of the reagents and procedures which may be followed:

I. Dark reactions with or without catalysts.
    A. Ketones and aldehydes.
    B. Quinones (all derivatives of benzoquinone).
    C. Sulfur and organic disulfides.
    D. Azo and azoxy dyes.
    E. Organic nitro compounds.

II. Biochemical with $O_2$ or with other hydrogen acceptors such as methylene blue.
    A. Dehydrogenases.
        (1) Succinodehydrogenase (muscle tissue or liver).
        (2) Yeast or fungi dehydrogenases.
        (3) Bacteria such as *B. coli* dehydrogenases.

III. Light reactions with hydrogen acceptors and/or catalysts.
    A. Visible light with Pd, Pt, or Os Black. +Quinones (in solvents).
    B. Visible light and methylene blue (in benzene or other solvents).
    C. Ultra-violet light+benzophenone or fluorenone (in solvents).
    D. Ultra-violet light+quinones with or without catalysts (in solvents).

The following examples are illustrative:

*Example 1.*—Two grams of cholesterol acetate, spectroscopically free from any provitamin D (in actual industrial practice, however, this rigid purification is not essential and the ordinary commercial grade of cholesterol acetate or any other ester or ether of cholesterol may be used to advantage) were mixed with about 0.4 gram of benzoquinone in a reaction tube which was evacuated and sealed off leaving a nearly complete vacuum in the tube. The tube was then heated at 120–130° C. for 2 hours, then cooled, and the brownish mixture extracted with ether. The ethereal solution was shaken several times with a solution of sodium hydrosulfite to reduce the unconverted quinone, then several times more with dilute alkali to remove the hydroquinone formed, then finally dried over anhydrous sodium sulfate, filtered and the ether removed under reduced pressure. The amount of provitamin D formed in this and all other reactions was estimated spectroscopically by determining the $$E_{1\ cm.}^{1\%}$$

value at 269 m$\mu$ the peak of a characteristic absorption band of the provitamin. This band is completely absent in pure cholesterol acetate. In accordance with this method, therefore, the crude residue from the above reaction yielded about 2% provitamin D. When a sample of this product was saponified and the provitamin D obtained irradiated in pure ethyl ether with ultra-violet light, a product was obtained which when assayed biologically in rate had a potency of considerably more than 6,500 U. S. P. vitamin D units per gram.

*Example 2.*—When the reaction described in Example 1 was repeated in exactly the same way except that the heating was continued to 6 hours, a product was obtained which showed a yield of 20% of provitamin D.

Although it is advantageous to carry out the reaction described in Examples 1 and 2 in vacuum or nearly vacuum, it is not absolutely essential, and gases, such as air or nitrogen, may be present.

To remove the provitamin from the unconverted material one can dissolve the crude product in benzene or petroleum ether and pass the solution through a long narrow tube packed with activated alumina, fuller's earth, aluminum oxide or any suitable solid used in chromatographic analysis and follow the bands formed by means of a fluorescence demonstration lamp. Cholesterol does not fluoresce in ultra-violet light, whereas the provitamin shows a strong green fluorescence. As the crude material is continuously washed down the tube with the pure solvent, the cholesterol is washed away, leaving behind the provitamin adsorbed on the surface of the inorganic solid. The provitamin can then be removed from the solid by extracting with a different solvent such as acetone or isopropyl ether. The product thus obtained was much purer than the original product and its absorption spectrum shows two prominent bands, the peaks of which are at 269 and 281 m$\mu$, identical with those of the natural antirachitic provitamins and of 7-dehydrocholesterol and ergosterol.

*Example 3.*—Two grams of cholesterol acetate was mixed with about 0.5 gram of benzoquinone and about 0.05 gram of palladium black in a sealed tube which had been previously evacuated. The mixture was heated at 120–130° C. for 2 hours, then cooled and treated as in the case of Examples 1 and 2. The provitamin D was estimated spectroscopically and found to be about 1.1%. Although the yield of provitamin D in this is slightly lower than in Example 1, the presence of palladium black reduced considerably the formation of by-products.

*Example 4.*—Two grams of cholesterol acetate was mixed with slightly less than equimolecular proportions of chloranil in a sealed tube which had been previously evacuated. The mixture was heated at 120–130° for 2 hours, cooled and treated as in the case of the previous examples. The provitamin D formed was estimated spectroscopically and found to be 7.8%.

*Example 5.*—Two grams of cholesterol acetate was mixed with 1.5 grams of chloranil in 40 cc. of benzene (thiophene-free) and the mixture allowed to stand at room temperature for 24 hours, then refluxed for 8 hours. The benzene was then removed at room temperature under reduced pressure, the residue dissolved in pure ethyl ether and treated as in the previous cases.

The provitamin formed in this case amounted to about 1.6%.

The reaction in this case yielded no by-products.

*Example 6.*—Two grams of cholesterol acetate was mixed in a sealed tube with the calculated amount of pure sulfur to remove two hydrogen atoms from the former. Another communicating portion of the tube contained moistened litharge which was used to absorb the hydrogen sulfide formed during the reaction. The tube was placed in an oven kept at 120–130° C. for two hours. At the end of this time the reaction was stopped and the cholesterol-acetate-sulfur mixture was extracted with ether and the ethereal solution distilled at room temperature under diminished pressure. The solid residue was then analyzed spectroscopically and found to contain about 11% provitamin D.

The same reaction may be carried out in a reaction vessel provided with means for bubbling nitrogen gas through the reaction mixture. The vessel may be immersed in an oil or metal bath kept at 120–130° while purified nitrogen is bubbled through the cholesterol-acetate-sulfur mixture to remove the hydrogen sulfide as soon as it is formed.

*Example 7.*—Two grams of cholesterol acetate was mixed with about 1 gram of diphenyl disulfide and the mixture heated in a sealed tube at 120–130° for 2 hours. The reaction mixture was then cooled and treated four times with a mixture of alcoholic potassium sulfide to remove the thiophenol and the unconverted diphenyl disulfide. When the product was analyzed spectroscopically considerable quantities of provitamin D were found.

*Example 8.*—One gram of cholesterol acetate was mixed with 0.5 gram of benzaldehyde in a sealed tube which had been previously evacuated and the mixture was heated at 125–130° C. for 2½ hours. The product was then cooled and recrystallized several times from ethyl alcohol. A spectroscopic analysis of the final product showed the presence of about 0.9% provitamin D.

*Example 9.*—Three grams of cholesterol acetate was mixed with 2.5 grams of methylene blue in a 50–50 mixture of benzene and dioxane. The mixture was stirred in nitrogen in a flask provided with a mercury seal and exposed at room temperature to ordinary light from a 250-watt bulb for one month. After this time the mixture was poured in water and the layers separated, the non-aqueous layer extracted several times with dilute acetic acid to remove the excess methylene blue. When all the latter had been removed the non-aqueous solvent was dried over anhydrous sodium sulfate, filtered, the solvent removed and the residue recrystallized several times from ethyl alcohol. The final product was analyzed spectroscopically and found to contain about 2.3% provitamin D.

*Example 10.*—Two grams of cholesterol acetate was mixed with 0.54 gram benzoquinone in 100 cc. of benzene (thiophene-free) and to the mixture was added 0.1 gram palladium black. The whole mixture was exposed to light from a 250-watt lamp at room temperature for one month. The benzene solution was then filtered and the filtrate distilled under diminished pressure and the residue dissolved in pure ethyl ether. Finally the ethereal solution was treated as in the case of Example 1, and the residue obtained from this analyzed spectroscopically. It was found to contain 0.9% provitamin D.

Other hydrogen acceptors such as eosin, indigo blue and other dyes of this class may be used.

We have used also benzophenone and fluorenone with cholesterol acetate using ultra-violet light and found some provitamin formed.

*Example 11.*—About 1 gram of cholesterol acetate, spectroscopically free from vitamin D, was well powdered and shaken well with about 500 cc. of a buffered solution of succinodehydrogenase prepared from beef heart according to the method of Thunberg (Biochem. Z. 285, 48 (1933)). The mixture was shaken well in air from time to time and allowed to stand at room temperature for several days. It was then extracted with pure ethyl ether and the residue obtained from the ethereal solution was recrystallized several times from ethyl alcohol and the final product analyzed spectroscopically. It was found to contain about 0.15% provitamin D. Although the yield of provitamin D by this method is small, it can probably be improved by using dehyrogenases from yeast, fungi or bacteria such as *B. coli.*

In addition to the results under quinones, anthraquinone has also been used in the dark at 120–130° and qualitatively we are able to say that considerable amount of provitamin was formed.

We claim:

1. Method for the production of provitamin D which comprises protecting the hydroxyl group of a 3-hydroxy-5-cholestene against dehydrogenation thereof by substituting the hydrogen atom thereof by a radical of the group consisting of alkyl and acyl radicals and subjecting the protected compound to the action of a hydrogen acceptor of the group consisting of ketones, aldehydes, quinones, sulfur, organic disulfides, azo dyes, azoxy dyes and organic nitro compounds, whereby a hydrogen atom on each of the carbon atoms in the 7 and 8 positions is removed.

2. Method as defined in claim 1 in which the hydrogen of the 3-hydroxyl group is replaced by an acyl radical.

3. Method as defined in claim 1 in which the hydrogen of the 3-hydroxyl group is replaced by an acetyl radical.

4. Method as defined in claim 1 in which the 3-hydroxy-5-cholestene is a member of the group consisting of cholesterol, sitosterol and stigmasterol.

5. Method as defined in claim 1 in which the dehydrogenation is carried out in the presence of a metallic catalyst.

6. Method as defined in claim 1 in which the dehydrogenation is carried out in the presence of an inert solvent.

7. Method as defined in claim 1 in which the dehydrogenation is carried out at an elevated temperature.

8. Method as defined in claim 1 in which the dehydrogenation is carried out in the presence of actinic light.

9. Method as defined in claim 1 in which the dehydrogenation is carried out under the exclusion of oxygen.

10. Method as defined in claim 1 in which the hydrogen acceptor is a quinone.

11. Method as defined in claim 1 in which the hydrogen acceptor is an organic disulfide.

NICHOLAS A. MILAS.
ROBERT HEGGIE.